T. J. MASON.
WINDMILL.
APPLICATION FILED MAR. 4, 1915.

1,197,047.

Patented Sept. 5, 1916.
3 SHEETS—SHEET 1.

WITNESSES:
Samuel E. Dads
C. E. Trainer

INVENTOR
Thomas J. Mason
BY Munn & Co.
ATTORNEYS

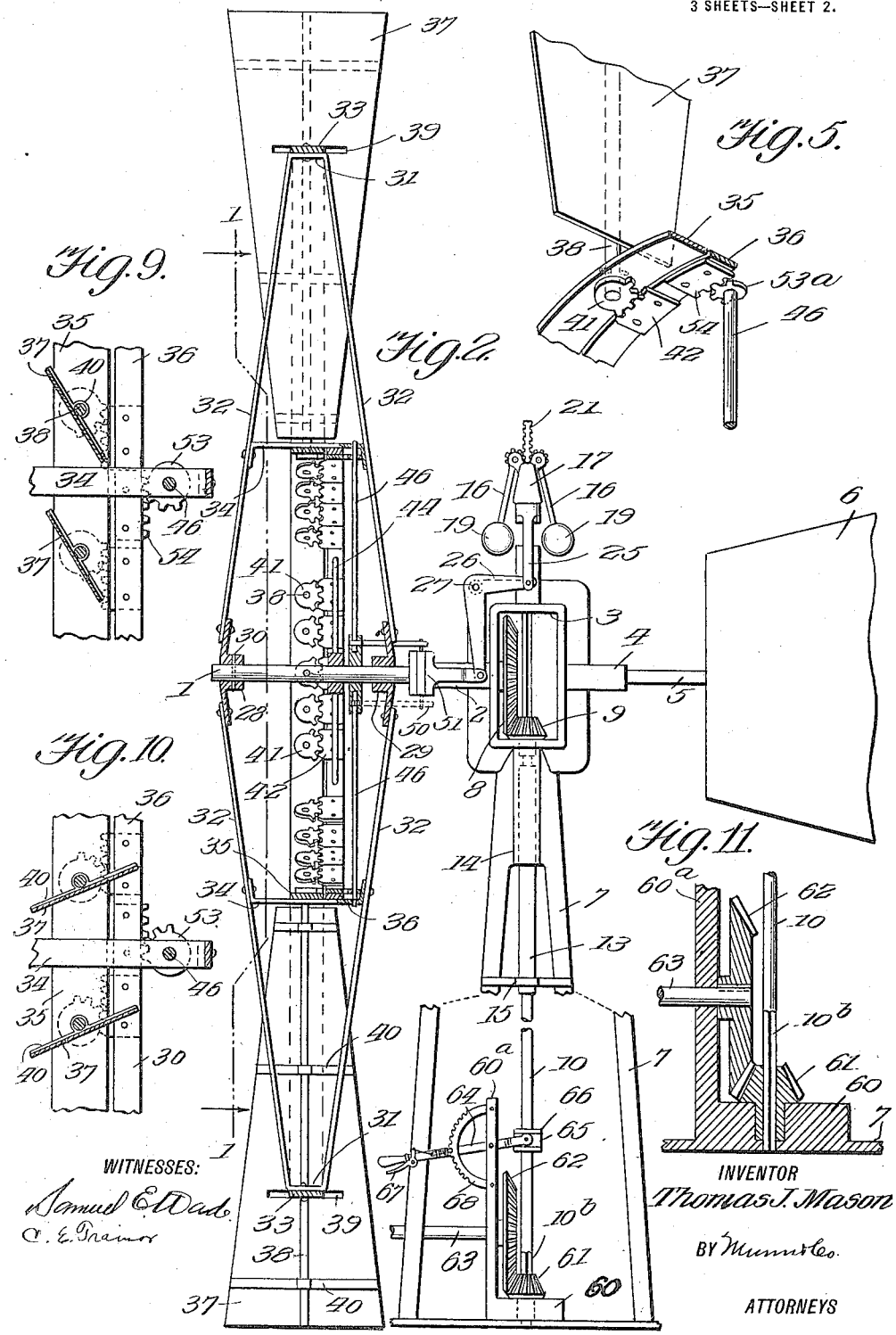

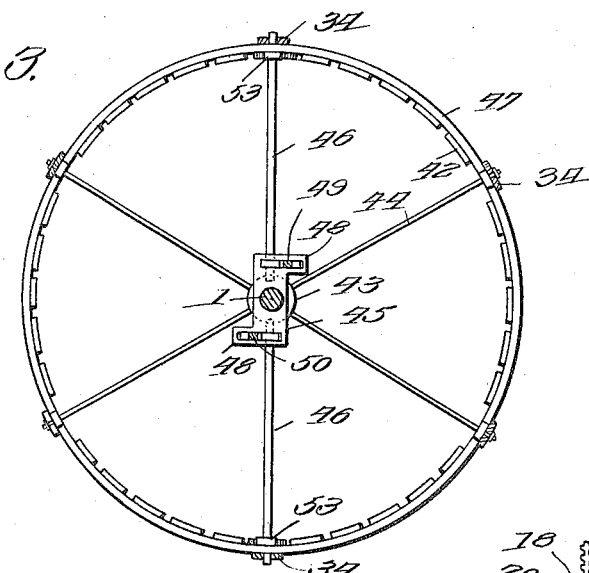
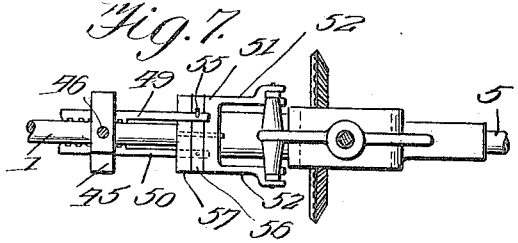
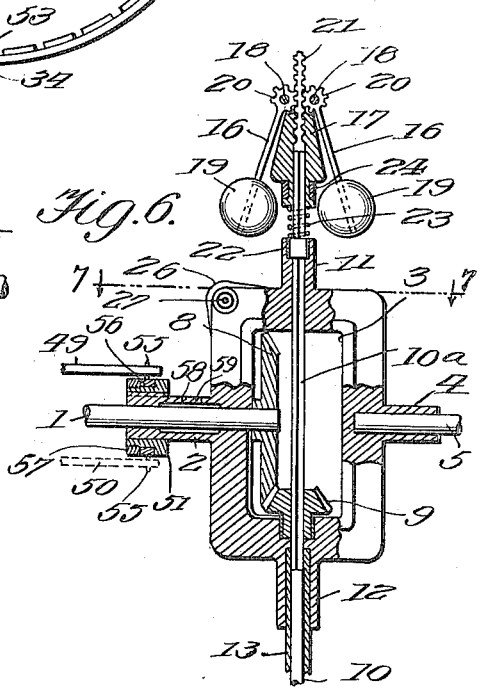

UNITED STATES PATENT OFFICE.

THOMAS J. MASON, OF OSCEOLA, IOWA.

WINDMILL.

1,197,047. Specification of Letters Patent. Patented Sept. 5, 1916.

Application filed March 4, 1915. Serial No. 11,994.

*To all whom it may concern:*

Be it known that I, THOMAS J. MASON, a citizen of the United States, and a resident of Osceola, in the county of Clark and State of Iowa, have invented a new and useful Improvement in Windmills, of which the following is a specification.

My invention is an improvement in wind mills, and has for its object to provide a mill of the character specified, wherein the wheel consists of a frame, and blades or vanes supported by the frame for oscillation on axes radial to the wheel to permit a greater or lesser amount of the surface of the blade to be exposed to the action of air currents, and wherein means is provided for simultaneously oscillating the blades or vanes, the said means being controlled by a governor driven by the wheel, to permit the automatic control of the speed of the wheel in accordance with the velocity of the air currents, and wherein other means, manually operated, is provided for permitting the angle of the blades with respect to the direction of the air currents to be varied.

Figure 1:
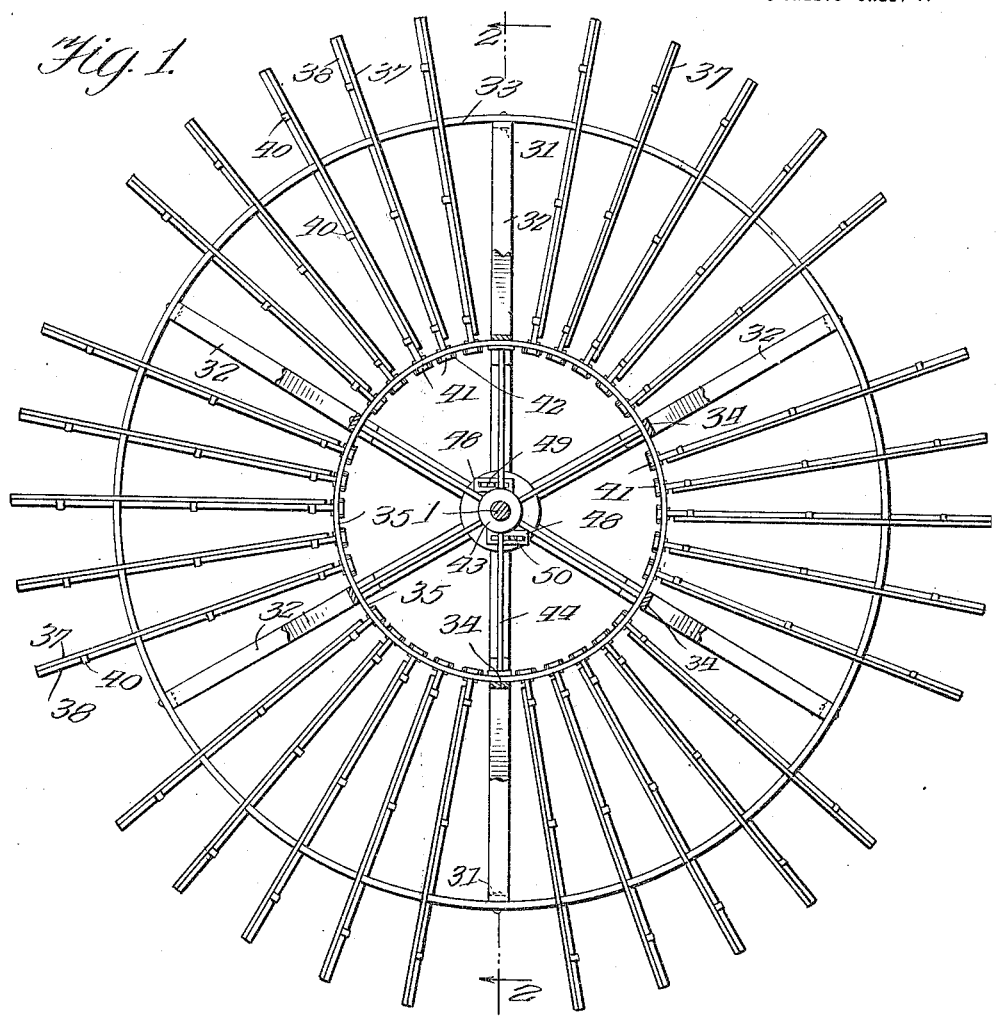
Figure 4:
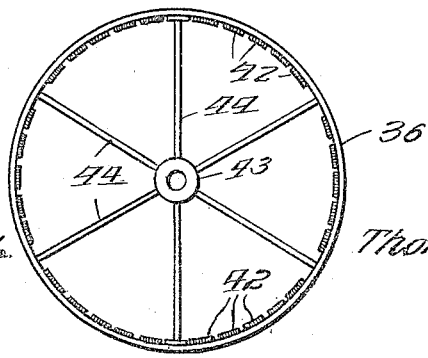

In the drawings:—Figure 1 is a section on the line 1—1 of Fig. 2, looking in the direction of the arrows adjacent to the line, Fig. 2 is a side view of the top of the supporting tower and the wheel with the wheel in section, the section being taken substantially on the line 2—2 of Fig. 1, Fig. 3 is a front view of the ring shifting mechanism, Fig. 4 is a front view of the shifting ring, Fig. 5 is a detail perspective view of a portion of the blade operating mechanism, Fig. 6 is a side view partly in section of the governor and mechanism connected therewith, Fig. 7 is a section on the line 7—7 of Fig. 6, looking in the direction of the arrows adjacent to the line, Fig. 8 is an enlarged detail section showing a portion of the blade operating mechanism, Figs. 9 and 10 are sections of the wheel, showing the blades in different positions, and Fig. 11 is a vertical section of the operated mechanism for the transmission of power.

In the present embodiment of the invention, a shaft 1 is provided, to which the wheel, to be later described, is connected, and one end of the shaft is received within a bearing sleeve 2, at one side of a substantially rectangular frame 3, having at the opposite side a second sleeve 4 in register and alinement with the sleeve 2, and another shaft or section of shaft 5 is received in the sleeve 4. The section 5 of the shaft is rigid with the sleeve 4, and a vane 6 is connected with the section 5, the said vane acting as a rudder to hold the wheel to the wind, that is, to hold the shaft 1—5 parallel with the direction of movement of the wind.

The frame 3 is supported at the top of a tower indicated generally at 7, and within the frame the shaft 5 has a bevel gear wheel 8, secured thereto, which meshes with a bevel pinion 9, arranged on the upper end of a shaft 10, which is journaled in the tower in vertical position. The shaft 10 has the portion near its upper end polygonal in cross section as indicated at 10, and the said portion passes through a similarly shaped hub in the pinion, and extends beyond the frame at each end, being held in sleeves 11 and 12 at the upper and lower ends of the frames, respectively.

The sleeve 12 is counterbored to receive the upper end of a tubular casing 13, which fits over the shaft 12, and is held at the upper end of the tower 7 in bearings 14 and 15. A governor is connected with the upper end of the shaft 10—10$^a$, the governor consisting of levers 16, pivoted to a support 17, arranged above the frame, the levers being mounted on pivot pins 18. A ball 19 is arranged at the free end of each lever, and each lever has a pinion or spur gear 20, concentric with the pivot pin 18. The spur gears engage oppositely arranged series of rack teeth 21 on the upper end of the shaft 10—10$^a$, and it will be evident that when the levers are moved outwardly by centrifugal force the shaft 10—10$^a$ would be moved downward. The support 17 is however, mounted to move on the shaft, and the shaft is provided with a collar 22, having a square opening for receiving the shaft 10, and the said collar permits the shaft to move vertically through the same. The collar rotates in a counterbore in the upper end of the sleeve 11, and a coil spring 23 encircles the shaft between the support 17 and the upper end of the collar and acts normally to press the support upward. The support has a reduced portion at its lower end, and this portion has an annular groove in which is received a sleeve 24.

An arm 25 depends from the sleeve and the lower end of the arm is connected to one of the arms of an elbow lever 26. This lever is pivoted to the frame 3 as indicated at 27 at the junction of the arms of the lever, and the other end of the lever is connected to mechanism for feathering the blades of the wheel, that is, for shifting the said blades to cause them to offer more or less resistance to the action of the winds.

The wheel consists of hubs 28 and 29, the former secured to the shaft by a pin 30. A series of substantially U-shaped brackets, each consisting of a body 31 and arms 32, is connected to the hubs, the bodies 31 of the brackets being outward, while the arms are connected to the respective hubs. The bodies of the brackets are connected by a ring or rim 33, and the arms of each bracket are connected intermediate their ends by a cross bar 34, the said cross bars being rigid with the arms and being parallel with the bodies 31 of the brackets.

A ring 35 is connected with the cross bars 34, half way between the arms 32 of the bracket, the adjacent arms of all of the brackets being in register, and another ring 36 is arranged on the inner side of the ring 35, the adjacent edges of the rings being spaced apart as shown.

A series of blades or vanes 37 is supported by the rings 33 and 35, each blade or vane being secured to a shaft 38, which is arranged longitudinally of the wing or vane and radial to the wheel. The blade and vanes are of course, also radial to the wheel, and the inner end of each shaft 38 passes through the ring 36. Each shaft also passes through an opening in the ring 33, and the said ring passes through the blades, each blade having a transverse slot 39 for receiving the ring. The shafts are held to the vanes by a series of straps 40, having holding rings engaging the shafts, and on the inner side of the ring 36 a mutilated spur gear 41 is secured to each shaft. A section of rack bar 42 is secured to the ring 35, for each spur gear 41, the said rack bars being in engagement with the teeth of the spur gears. The blades or vanes are all similarly arranged, and since each rack bar 42 is secured to the ring 36 and is in mesh with the adjacent spur gear 41, it will be obvious that when the ring 36 is moved angularly with respect to the ring 35, all of the shafts 38 will be simultaneously rotated in the same direction to simultaneously change the angle of the vanes 37.

The ring 36 is mounted to rotate, and is connected to a hub 43 on the shaft 1, by means of spokes 44. A plate 45 is arranged on the shaft 1 adjacent to the hub 43, and the plate has bearings at its ends in which are journaled the inner ends of shafts 46. The shafts are arranged diametrically of the ring 36 at the inner side thereof, and the outer end of each shaft is journaled in a cross bar 34. The plate 45 has a lateral extension 48 at each end, the extensions extending in opposite directions and each extension is slotted transversely of the plate and longitudinally of the extension to form a guide for receiving a rack bar, the rack bars 49 and 50 being connected to a sliding member 51, mounted on the shaft 1. The outer end of each rack bar 49 and 50 is connected to the sliding member 51, by means of a pin or the like, and the sliding member has arms 52 which are connected to the depending arm of the elbow lever 26. The rack bars engage pinions or spur gears 53, secured to the shafts 46 in the guideways of the extensions 48, and a mutilated spur gear 53ª is secured to the outer end of each of the said shafts 46. Each spur gear 53 meshes with the teeth of a rack bar 54, secured to the ring 36 at this point, and it will be obvious that when the shafts 46 are rotated by the movement of the rack bars 49 and 50, the ring 36 will be shifted to move the rack bars 42 to simultaneously rotate the shafts 38 of the blades or vanes 37.

The rack bars 49 and 50 are arranged to simultaneously rotate the shafts 46 in the same direction, and it will be obvious that when the levers 16 are thrown outward by an increase in speed in the shaft 10—10ª, the support 17 will be moved upward, swinging the elbow lever 26 in a direction to move the slide 51 toward the bevel gear wheel 8. This movement of the slide 51 will cause the rack bars 49 and 50 to simultaneously rotate the shafts 46 in the same direction, and the said shafts will move the ring 36 angularly with respect to the ring 35 in a direction to cause the shafts 38 to move the blades or vanes 36 in a direction to expose a lesser surface to the action of the wind.

Referring to Figs. 9 and 10, the position of the vanes will be seen. In Fig. 9 the blades or vanes are at that position where the greatest surface is exposed to the action of the wind. In Fig. 10 the blades are in the reverse position, that is, in a position to prevent the operation of the wind mill. The mill will thus be self-governing, insuring a uniform speed whatever the force of the wind. When the currents are light, the balls 19 will hold the lever 16 in the position of Fig. 2, and the blades or vanes 87 will expose the greatest surface to the action of the said air currents. When the velocity of the air currents increases the weights will be thrown outward, shifting the planes of the blades or vanes more nearly into parallelism with the direction of motion of the air currents.

The rack bars 49 and 50 are connected to the slide or collar 51, by means of pins 55, the said pins passing through the inner ends of the rack bars into engagement with a collar 56, which is arranged on the slide or collar 51. One end of the slide or collar 51 is turned down externally to receive the ring 56, and to permit the ring to be placed at the center of the collar. A second collar 57 is then threaded on to the turned down portion outside of the collar to hold it in place. The collar 56 is thus free to rotate with respect to the slide 51, while moving therewith longitudinally of the shaft 1. The slide is mounted on the sleeve 2, and it will be noted from an inspection of Fig. 6 that the bore of the sleeve is enlarged near its connection with the frame to form an oil receptacle 58, and there is an opening 59 at the upper side of the sleeve for permitting oil to be inserted into the receptacle.

Mechanism is also provided for permitting the blades to be shifted manually, the said mechanism being arranged at the foot of the tower 7. An angle bracket 60—60ᵃ is arranged at this point, the portion 60 of the bracket seating on the horizontal portion of the tower, while the portion 60ᵃ extends vertically upward. The shaft 10 extends through the portion 60 of the bracket, and this portion of the shaft is polygonal in cross section as indicated at 10ᵇ. A bevel gear 61 is arranged on the polygonal portion of the shaft, the governor shaft having an extension fitting a counterbore in the portion 60 of the bracket. The bevel gear 61 meshes with the gear 62 of a horizontal shaft 63, and from this shaft 63 power may be taken, as for instance, a pump may be connected with the said shaft, or any other machinery which it is desired to operate from the wheel. A lever 64 is pivoted to the portion 60ᵃ of the bracket and the inner end of the lever is forked, and the arms of the fork are connected with a collar 65, journaled in an annular groove in a lever 66, secured to the shaft 10. The lever has latch mechanism 67, coöperating with a toothed sector 68 on the portion 60ᵃ of the bracket to hold the shaft in adjusted position.

The vertical shaft for a twelve foot wheel would be of one inch material, having both ends turned down to three-fourths inch square. When at rest the shaft is lifted so that the upper end of the rounded portion rests against the lower end of the hub of the gear wheel 9, and can move no farther. When the mill is running, the shaft 10 is lowered until the lower end of the rounded portion rests against the upper end of the bevel gear 61. When in this position the governor will control the position of the sails or vanes, holding the wheel to a predetermined speed, and to that speed which will give the best results at the machine operated. When the wheel is at rest the lever 64 supports the weight of the shaft 10 and connected parts, and it will be evident that this lever must have sufficient strength for this purpose, and it should have a considerable leverage. In practice the lever would have a much greater length than shown in Fig. 2, where the lever is shortened for convenience. With a twelve foot wheel the arms 16 should have a length of twelve inches, and the balls should have a diameter of four inches. The spur gears 20 on the arms should be as small as consistent with strength. When the shaft 10 is lowered as above stated, the balls 19 will be thrown out slightly, and the sails or vanes will be turned to receive the wind to cause the wheel to revolve. When the wheel exceeds a predetermined speed the balls will be thrown out farther from the shaft, and the support 17 will be lifted, swinging the elbow lever 26 to change the angle of the sails or vanes, that is, to lessen the surface exposed to the action of the wind. The governor will thus regulate the speed of the wheel to the best possible advantage. When it is desired to put the wheel out of commission, that is, to turn the sails or vanes so that the air currents will not affect the wheel, the shaft 10 is lifted until the upper end of the rounded portion engages the lower end of the bevel-gear 9. In this position the balls 19 lie close against the support 17, and the sails or vanes are turned into the position of Fig. 10. The shaft 10 not only transmits the power to the machine to be operated but in addition this shaft being vertically movable controls the operation of the vanes, and as a result controls the operation of the wheel. When the shaft is in its upward position the wheel is inoperative, the vanes being turned so that they offer no resistance to the air currents. To start the wheel it is only necessary to release the lever from its sector, and lower the shaft.

The improved mill may be safely left in working position, for the control in automatic, the blades being shifted in accordance with the strength of the air currents. There is no possibility of damage to the wheel or connected parts, because the governor will hold the wheel to a predetermined speed. The plate 45, before mentioned, has transverse passageways 70 at its upper and lower ends, through which the rack bars 49 and 50 extend.

A roller 71 is journaled in each passage 70 at the outer side of the adjacent rack bar for holding the rack bar in close contact with the pinion. Each pinion 53 is a mutilated gear, the teeth being only at the point where the rack bar engages the same. The blades 38 are firmly supported, the shaft 33 passing through the slots 39 and the shafts 38 are, as before stated, journaled in openings in the ring. The slots 39 are of sufficient length to permit the blades to be turned from the position of Fig. 9 to that of Fig. 10.

I claim:—

1. In a wind mill of the vertical feathering blade type, the shafts of the blades having toothed gear elements fastened thereto, a ring in the plane of the wheel and coaxial therewith, and provided with teeth in mesh with the gear elements of the blades, radially disposed shafts geared at their outer ends with the said ring, a member mounted to reciprocate axially of the wheel, oppositely disposed connections between the said member and the inner ends of the radially disposed shafts, an axially movable power shaft geared to the wheel, a governor mechanism mounted on the power shaft and having connection with the axially movable member, and a manually controlled member connected with the power shaft for moving the same and controlling the action of the wheel.

2. In a wind mill of the vertical feathering blade type, a ring in the plane of the wheel and coaxial therewith and geared to the blades to effect a feathering thereof, oppositely disposed shafts geared at their outer ends to the ring, bars geared to the inner ends of said shafts, a member mounted to reciprocate axially of the wheel and connected with the said bars, an axially movable power shaft geared to the wheel, a vertically movable member mounted upon the power shaft and connected with the said axially movable member, a governor mechanism supported by the vertically movable member, and a manually operable member connected with the power shaft for moving the same and controlling the action of the wheel.

3. In a wind mill, comprising a series of radial blades mounted to oscillate on their long axes, and a shaft to which the blades are connected to rotate the shaft when the blades are moved angularly, a common means engaging the blades for simultaneously shifting them in the same direction, a power shaft having a driving connection with the shaft and movable vertically, means for lifting the shaft and holding it in elevated position, a centrifugal governor supported on the shaft and driven thereby, and a connection between the governor and the blades for varying the angle of the blades in accordance with the speed of rotation of the shaft, a connection between the power shaft and the governor for moving the governor to control the movement of the blades into and out of operative position.

THOMAS J. MASON.

Witnesses:
WILLIAM H. TETTEN,
D. RUSSELL ROBINSON.